United States Patent
Hochstetler et al.

(10) Patent No.: US 10,670,126 B2
(45) Date of Patent: Jun. 2, 2020

(54) VARIABLE BLOCK SHAFT FOR INTEGRATED DRIVE GENERATOR

(71) Applicant: HAMILTON SUNDSTRAND CORPORATION, Charlotte, NC (US)

(72) Inventors: Derek R. Hochstetler, Rockford, IL (US); Ted A. Martin, Byron, IL (US); Duane C. Johnson, Beloit, WI (US); Glenn C. Lemmers, Jr., Loves Park, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 227 days.

(21) Appl. No.: 15/868,117

(22) Filed: Jan. 11, 2018

(65) Prior Publication Data
US 2019/0211910 A1    Jul. 11, 2019

(51) Int. Cl.
*F16H 39/14* (2006.01)
*F16H 47/04* (2006.01)
(Continued)

(52) U.S. Cl.
CPC .............. *F16H 39/14* (2013.01); *F02C 7/32* (2013.01); *F16C 3/02* (2013.01); *F16C 19/26* (2013.01); *F16C 33/585* (2013.01); *F16H 47/04* (2013.01); *H02K 7/003* (2013.01); *H02K 7/116* (2013.01); *H02K 7/1823* (2013.01); *H02K 15/0006* (2013.01); *F02K 99/00* (2013.01); *F05D 2220/7642* (2013.01); *F16C 2326/06* (2013.01);
(Continued)

(58) Field of Classification Search
CPC .... F02C 7/32; F02K 99/00; F05D 2220/7642; F16C 3/02; F16C 3/023; F16C 19/26; F16C 33/585; F16C 2326/06; F16C 2326/42; F16C 2361/61; F16H 39/14; F16H 47/04; F16H 55/17; H02K 7/003; H02K 7/116; H02K 7/1823; H02K 15/0006
USPC .......................................... 464/178, 179, 182
See application file for complete search history.

(56) References Cited

U.S. PATENT DOCUMENTS

| 4,990,807 A | 2/1991 | Flygare et al. |
| 5,247,794 A | 9/1993 | Benson et al. |
| (Continued) | | |

FOREIGN PATENT DOCUMENTS

WO    WO-2014023850 A1 *    2/2014    .............. F03D 13/20

OTHER PUBLICATIONS

European Search Report for EP Application No. 19151408.2 dated Mar. 26, 2019.

*Primary Examiner* — Josh Skroupa
(74) *Attorney, Agent, or Firm* — Carlson, Gaskey & Olds, P.C.

(57) ABSTRACT

A variable block shaft has a radially enlarged disc formed at a first end. A shaft portion extends from the disc to a second end. An inner bearing race surface is defined intermediate the first and second end and has an outer peripheral surface. An axial length of the inner bearing race surface is defined between inner facing surfaces of lands at each axial side. The axial distance is measured along the center axis of the body and an outer diameter to the inner bearing race surface being defined as a first distance. The axial length of the inner bearing race surface is defined as a second distance and a ratio of the first distance to the second distance being between 3.75 and 3.90. An integrated drive generator and a method are also disclosed.

20 Claims, 3 Drawing Sheets

(51) Int. Cl.
  *H02K 7/18*     (2006.01)
  *H02K 15/00*    (2006.01)
  *F16C 3/02*     (2006.01)
  *F02C 7/32*     (2006.01)
  *F02K 99/00*    (2009.01)
  *F16H 55/17*    (2006.01)
  *H02K 7/116*    (2006.01)
  *H02K 7/00*     (2006.01)
  *F16C 19/26*    (2006.01)
  *F16C 33/58*    (2006.01)

(52) U.S. Cl.
  CPC ...... *F16C 2326/43* (2013.01); *F16C 2361/61* (2013.01); *F16H 55/17* (2013.01)

(56) References Cited

U.S. PATENT DOCUMENTS 9,353,690 B2 *  5/2016  Makulec .................. F01D 5/026
9,482,265 B2 * 11/2016  Campbell ............. F16C 33/585
9,625,028 B2 *  4/2017  McKinzie ................. F16D 1/06
9,714,702 B2 *  7/2017  Campbell ............. F16H 57/043

* cited by examiner

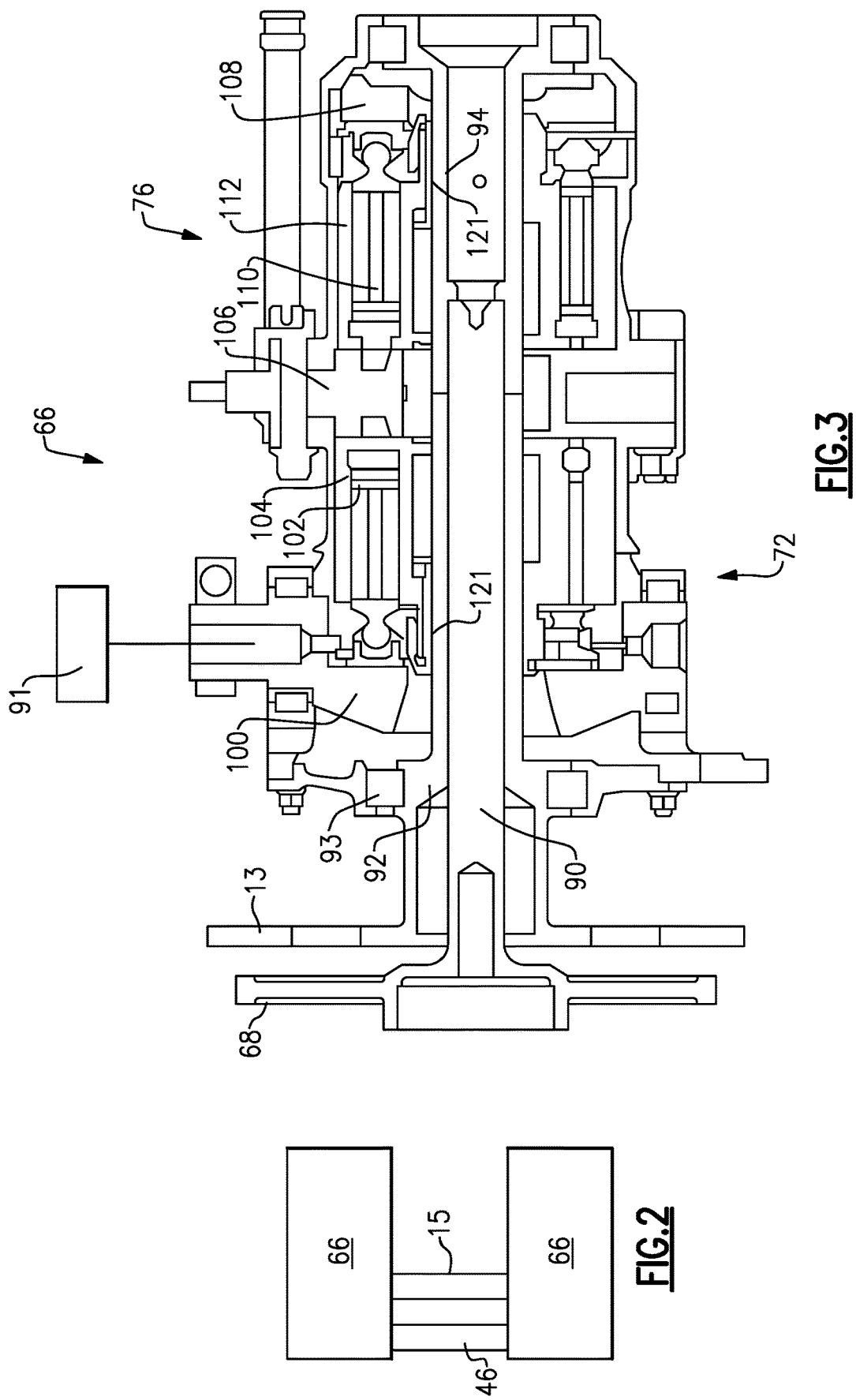

VARIABLE BLOCK SHAFT FOR INTEGRATED DRIVE GENERATOR

BACKGROUND

This application relates to a variable block shaft for use in a hydraulic unit for an integrated drive generator.

Integrated drive generators are known and often utilized in aircraft. As known, a gas turbine engine on the aircraft provides a drive input into a generator input shaft. The generator typically includes a disconnect shaft that can transmit the input into a gear differential. The gear differential selectively drives a main generator to provide electric power for various uses on the aircraft.

It is desirable that the generated power be of a desired constant frequency. However, the speed from the input shaft will vary during operation of the gas turbine engine. This would result in variable frequency.

Integrated drive generators are provided with speed trimming hydraulic units. Gears associated with the differential and, in particular, a ring gear portion, provide rotation from the differential back into the trimming unit. A carrier also rotates another portion of the trimming unit. The trimming unit is operable to result in the output speed of the differential being effectively constant, such that electric power of a desirable frequency is generated.

The generator is mounted between two housing portions and a seal plate is mounted between the two housing portions.

In addition, various accessory systems, such as various pumps, are driven by the ring gear of the differential through an accessory drive gear.

A variable block shaft in the hydraulic unit raises design challenges.

SUMMARY

A variable block shaft for use in an integrated drive generator has a shaft body extending from a first end to a second end. A radially enlarged disc is formed at the first end. A shaft portion extends from the disc to the second end. An inner bearing race surface is defined intermediate the first and second end and has an outer peripheral surface. An axial length of the inner bearing race surface is defined between inner facing surfaces of lands extending radially outwardly of each axial side of the inner bearing race surface. The axial distance is measured along the center axis of the body and an outer diameter to the inner bearing race surface being defined as a first distance. The axial length of the inner bearing race surface is defined as a second distance and a ratio of the first distance to the second distance being between 3.75 and 3.90.

In addition, an integrated drive generator and a method of replacing variable block shaft in an integrated drive generator are also disclosed and claimed.

These and other features may be best understood from the following drawings and specification.

BRIEF DESCRIPTION OF THE DRAWINGS

FIG. 2 schematically shows hydraulic units in the integrated drive generator.
FIG. 3 shows the components of a hydraulic unit.

DETAILED DESCRIPTION

Figure 1:
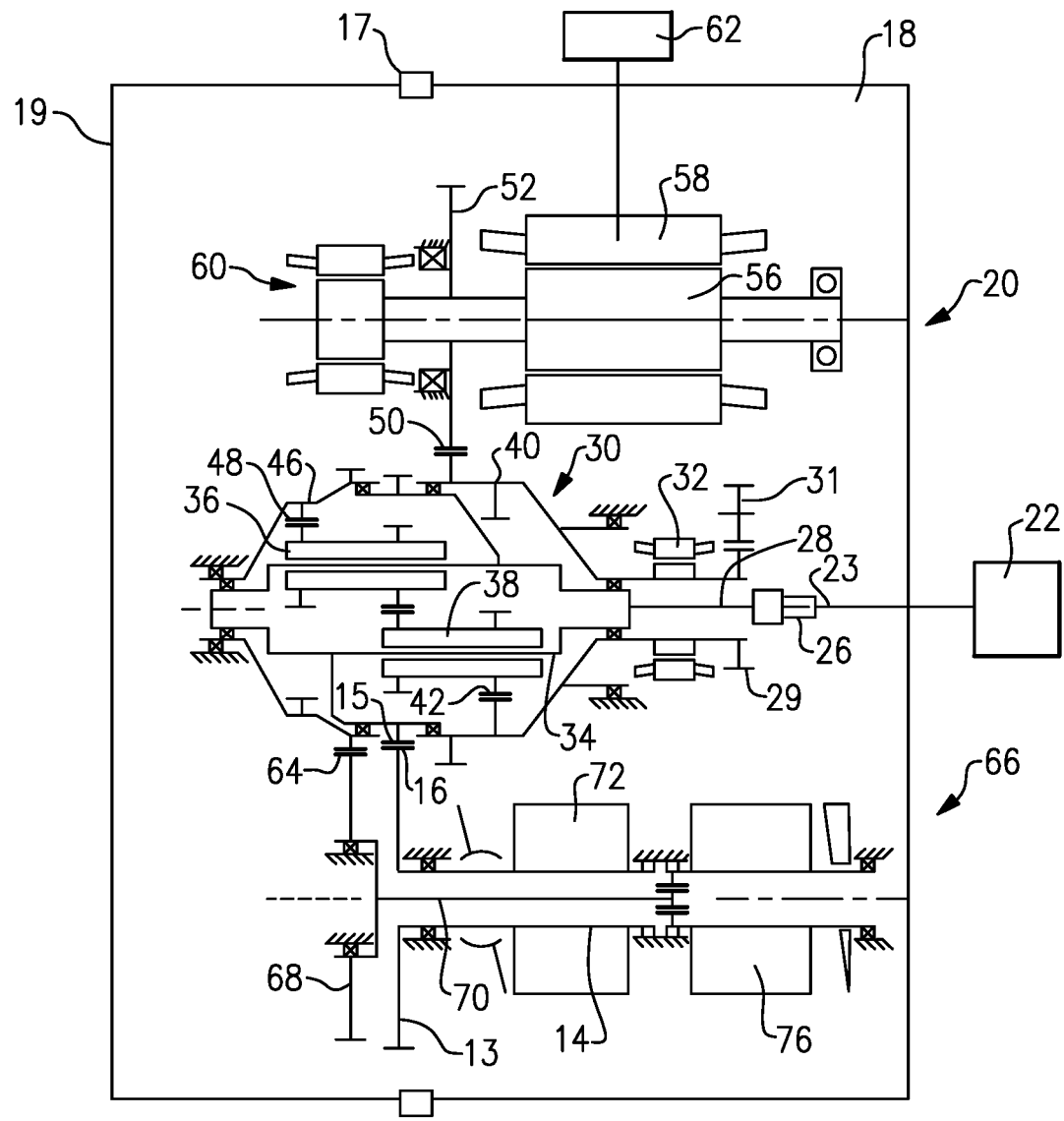
FIG. 1 schematically shows an integrated drive generator.

FIG. 1 shows an integrated drive generator 20. As shown, housing portions 18 and 19 surround the integrated drive generator and a seal plate 17 sits between the housing portions 18 and 19.

A gas turbine engine 22 may drive an input shaft 23 which selectively drives a disconnect assembly 26. The disconnect assembly 26, in turn, drives a carrier shaft 28, which drives a carrier in a gear differential 30.

As the carrier shaft 28 rotates, planet gears 36 and 38 are caused to rotate. Gears 38 have a gear interface 42 with a first ring gear portion 40. Gears 36 have a gear interface 48 with a second ring gear portion 46.

Ring gear portion 40 has a gear interface 50 with a main generator drive gear 52. When drive gear 52 is driven to rotate, it rotates a rotor 56 associated with a stator 58 of the main generator as well as an exciter rotor 60. Electric power is generated for a use 62, as known.

It is desirable that the frequency of the generated electric power be at a desired frequency. This requires the input speed to gear 52 to be relatively constant and at the desired speed. As such, the speed of the input shaft 23 is added to the speed of the speed trimmer 66 to result in a constant input speed to gear 52.

A gear 15 that is part of the carrier has a gear interface 16 with a gear 13 driving a shaft 14 also within the speed trimmer.

As known, the speed trimmer 66 includes a variable unit 72 and a fixed unit 76. The units 72 and 76 may each be provided with a plurality of pistons and a swash plate arrangement. If the input speed of the gear 13 is too high, the speed of the gear 52 will also be too high, and hence, the speed trimmer 66 acts to lower the speed of the trim gear 46 which will drop the speed of gear 52. On the other hand, if the input speed is too low, the speed trimmer will increase the trim gear speed and he speed seen by gear 52 will increase.

In essence, the variable unit 72 receives an input through gear 13 that is proportional to the speed of the input shaft 23. The variable unit 72 also receives a control input from a control monitoring the speed of the generator rotor 56. The position of the swash plate in the variable unit 72 is changed to in turn change the speed and direction of the fixed unit 76. The fixed unit 76 can change the speed, and direction of rotation of the shaft 70, and this then provides control back through the trim ring gear 46 to change the speed reaching the generator. In this manner, the speed trimmer 66 results in the frequency generated by the generator being closer to constant, and at the desired frequency.

A permanent magnet generator 32 rotates with the ring gear 40.

An accessory drive shaft 29 rotates with the ring gear 40 and drives a plurality of accessory gears 31.

The operation of the integrated drive generator 20 is generally as known in the art. A worker of ordinary skill would recognize that the desired frequency and speed at use 62 would dictate a number of design functions.

FIG. 2 shows that there are a pair of hydraulic or speed trimming units 66 associated with a single ring gear 46 and a single carrier 15.

FIG. 3 shows details of the hydraulic unit 66. A speed into the gear 13 will be proportional to the speed from the input shaft 23. The gear 13 rotates with a variable block shaft 92. The shaft 92 is supported on bearing 93. The shaft, through splined teeth 121, drives a cylinder block 104 to rotate.

A control 91 changes the position of a swash plate 100 based upon the input speed seen at the generator. As the cylinder block 104 rotates, pistons 102 within the cylinder block cam off a surface of the swash plate 100. As the position of the swash plate 100 is changed by control 91, the amount of hydraulic fluid driven by the pistons 102, through a port plate 106, and against piston 110 in a cylinder block 112 changes. As the pistons 110 move, they cam off a surface of fixed swash plate 108. This results in a control of a speed and direction of rotation of cylinder block 112. Cylinder block 112 has a spline connection at 121 to a shaft 94. Thus, the hydraulic unit 66 results in a desired speed and direction of rotation of the shaft 94, ultimately based upon the input speed seen at the generator. The shaft 94 drives the shaft 90 through splines 137 to in turn drive the gear 68. The gear 68 interacts with the trim ring gear 46 such that the ultimate speed leaving the differential 30 to the gear 52 is controlled to achieve a constant desired speed at the generator.

The cylinder blocks 104 and 112 are effectively identical. In addition, there are similar cylinder blocks 104/112 in both of the hydraulic units 66.

Figure 4A:
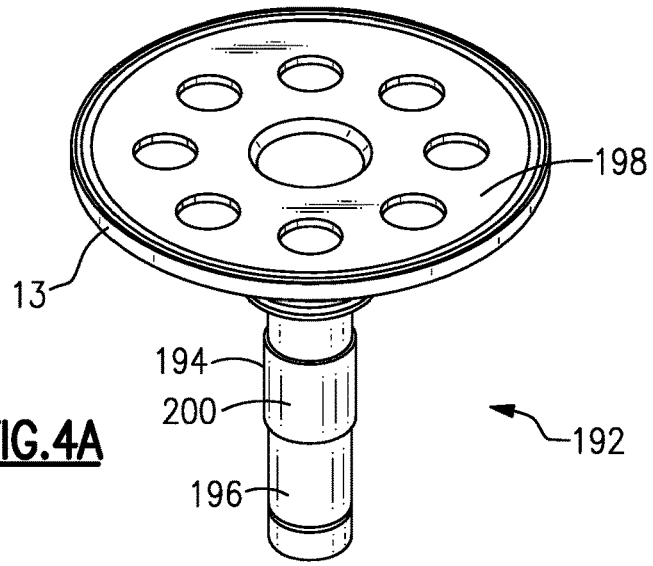
FIG. 4A shows a variable block shaft.

FIG. 4A shows a variable block shaft 192 which can be incorporated into the hydraulic unit of FIG. 3. A shaft body 194 has a shaft portion 196 and splines 200, which engage to drive the cylinder block as shown at 121 in FIG. 3. A disc 198 provides the gear teeth for engaging the carrier, as shown at 15/16 in FIG. 1.

Figure 4B:
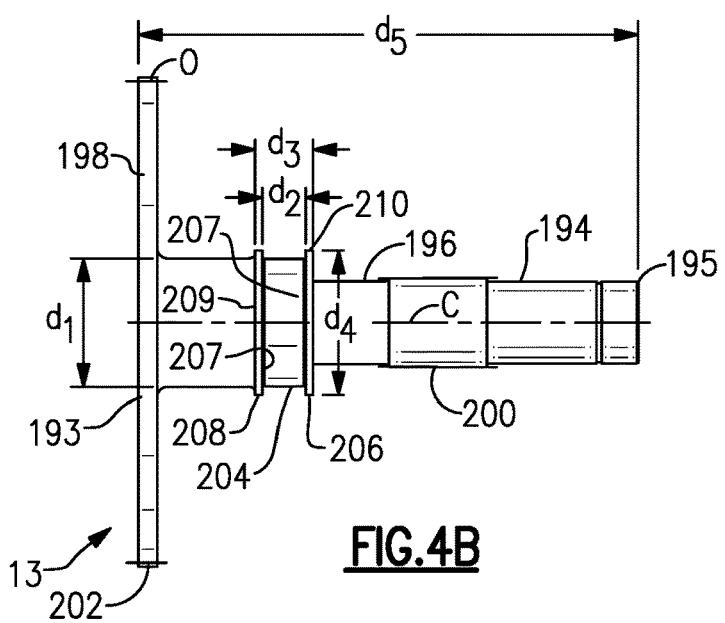
FIG. 4B is a side view of the variable block shaft.

As shown in FIG. 4B, the body 194 extends from a first end 193 at which disc 198 is defined to a second end 195. Gear teeth 202 are formed at the outer periphery O of the disc 198. An inner bearing race 204 is defined between lands 206 and 208. An outer diameter of the inner bearing race 204 is defined as $d_1$ and in one embodiment was 1.517 inches (3.853 centimeters). The inner bearing race 204 extends for an axial distance along a center line C between inner facing surfaces 207 of the lands 206 and 208. In one embodiment, $d_2$ was 0.397 inches (1.000 centimeters). A distance $d_3$ is defined between the outer facing surfaces 209 of the lands 206 and 208. In an embodiment, $d_3$ was 0.547 inch (1.458 centimeters). An outer diameter to an outer surface 210 of the land 206 is defined as $d_4$. In one embodiment, $d_4$ was 1.712 inches (4.348 centimeters). A distance $d_5$ is defined between the ends 193 and 195 and begin along the center axis C. In an embodiment, $d_5$ was 5.772 inches (14.661 centimeters). For all of the dimensions disclosed herein, a tolerance range of +/−0.010 inch (0.025 centimeter) should be used.

In an embodiment, a ratio of $d_1$ to $d_2$ was between 3.70 and 3.95. A ratio of $d_2$ to $d_3$ was between 0.60 and 0.85. A ratio of $d_1$ to $d_4$ was between 0.70 and 1.00. A ratio of $d_2$ to $d_5$ was between 0.050 and 0.085.

Figure 4C:
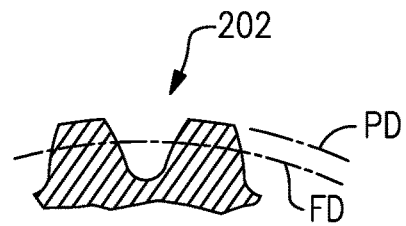
FIG. 4C is a gear tooth profile.

FIG. 4C is a profile of the gear teeth 202. In an embodiment, a pitch diameter PD was 5.65 inches (14.351 centimeters). A maximum form diameter FD was 5.544 inches (14.082 centimeters). There are 113 teeth 202.

The roll angle at A was 17.23 degrees and in embodiments between 16.5 and 18.0 degrees. The roll angle at B was 18.50 degrees and in embodiments between 17.7 and 19.2 degrees. The roll angle at C was 22.25 degrees and in embodiments between 21.5 and 23.0 degrees. The roll angle at D was 23.50 degrees and in embodiments between 22.8 and 24.3 degrees.

The roll angle at A may be applied at the form diameter FD. The roll angle at B is 20 percent away from roll angle A and between roll angle A and roll angle D. The roll angle at C is 80 percent away from roll angle A and between roll angle A and roll angle D. The roll angle at D is at the outer diameter of the gear tooth.

In an embodiment, there are 42 of the spline teeth. The spline teeth have a pitch diameter of 1.050 inches (2.667 centimeters) and a maximum diameter of 1.025 inches (2.604 centimeters).

A method of replacing a variable block shaft includes the steps of removing an existing variable block shaft from an integrated drive generator having an input shaft connected to a differential. The differential is connected to a generator, and to a hydraulic unit. The hydraulic unit includes the existing variable block shaft connected to the differential, and a variable swash plate and a fixed swash plate, each of which is associated with a set of pistons. A fixed shaft is associated with the fixed swash plate, and is connected to rotate by a cylinder block associated with the fixed swash plate. The fixed shaft includes a spline connection to drive a fixed block shaft, which has gear teeth engaged to a ring gear in the differential. The existing variable block shaft is replaced with a replacement variable block shaft having a shaft body extending from a first end to a second end, a radially enlarged disc formed at the first end and a shaft portion extending from the disc to the second end. An inner bearing race surface is defined intermediate the first and second end and has an outer peripheral surface, and at axial length of the inner bearing race surface being defined between inner facing surfaces of lands extending radially outwardly of each axial side of the inner bearing race surface, and the axial distance being measured along the center axis of the body and an outer diameter to the inner bearing race surface being defined as a first distance, and the axial length of the inner bearing race surface being defined as a second distance, and a ratio of the first distance to the second distance being between 3.70 and 3.95.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A variable block shaft for use in an integrated drive generator comprising:
 a shaft body extending from a first end to a second end, a radially enlarged disc formed at said first end, and a shaft portion extending from said disc to said second end, an inner bearing race surface defined intermediate said first and second end and having an outer peripheral surface, and at an axial length of said inner bearing race surface being defined between inner facing surfaces of lands extending radially outwardly of each axial side of said inner bearing race surface, and said axial distance being measured along the center axis of said body and an outer diameter to said inner bearing race surface being defined as a first distance, and said axial length of said inner bearing race surface being defined as a second distance, and a ratio of said first distance to said second distance being between 3.75 and 3.90.

2. The variable block shaft as set forth in claim 1, wherein a third distance is defined between an outer facing surfaces of said lands and a ratio of said second distance to said third distance being between 0.60 and 0.85.

3. The variable block shaft as set forth in claim 2, wherein an outer diameter to an outer surface of one of said lands is defined as a fourth distance and a ratio of said first distance to said fourth distance being between 0.70 and 1.00.

4. The variable block shaft as set forth in claim 3, wherein a fifth distance is defined between said first and second ends along said center axis and a ratio of said second distance to said fifth distance being between 0.050 and 0.085.

5. The variable block shaft as set forth in claim 1, wherein an outer diameter to an outer surface of one of said lands is defined as a fourth distance and a ratio of said first distance to said fourth distance being between 0.70 and 1.00.

6. The variable block shaft as set forth in claim 1, wherein a fifth distance is defined between said first and second ends along said center axis and a ratio of said second distance to said fifth distance being between 0.050 and 0.085.

7. The variable block shaft as set forth in claim 1, wherein there are one hundred and thirteen gear teeth at an outer periphery of said disc.

8. An integrated drive generator comprising:
an input shaft connected to a differential, said differential connected to a generator, and said differential also being connected to a hydraulic unit, said hydraulic unit including a variable block shaft connected to said differential and a variable swash plate and a fixed swash plate, and each of said swash plates being associated with a set of pistons, and a fixed shaft associated with said fixed swash plate, and connected to a cylinder block associated with said fixed swash plate, and said fixed shaft including a spline connection to drive a fixed block shaft, said fixed block shaft having gear teeth engaged to a ring gear in said differential; and
said variable block shaft having a shaft body extending from a first end to a second end, a radially enlarged disc formed at said first end and a shaft portion extending from said disc to said second end, an inner bearing race surface defined intermediate said first and second end and having an outer peripheral surface, and at axial length of said inner bearing race surface being defined between inner facing surfaces of lands extending radially outwardly of each axial side of said inner bearing race surface, and said axial distance being measured along the center axis of said body and an outer diameter to said inner bearing race surface being defined as a first distance, and said axial length of said inner bearing race surface being defined as a second distance, and a ratio of said first distance to said second distance being between 3.75 and 3.90.

9. The integrated drive generator as set forth in claim 8, wherein a third distance is defined between an outer facing surfaces of said lands and a ratio of said second distance to said third distance being between 0.60 and 0.85.

10. The integrated drive generator as set forth in claim 9, wherein an outer diameter to an outer surface of one of said lands is defined as a fourth distance and a ratio of said first distance to said fourth distance being between 0.70 and 1.00.

11. The integrated drive generator as set forth in claim 10, wherein a fifth distance is defined between said first and second ends along said center axis and a ratio of said second distance to said fifth distance being between 0.050 and 0.085.

12. The integrated drive generator as set forth in claim 8, wherein an outer diameter to an outer surface of one of said lands is defined as a fourth distance and a ratio of said first distance to said fourth distance being between 0.70 and 1.00.

13. The integrated drive generator as set forth in claim 8, wherein a fifth distance is defined between said first and second ends along said center axis and a ratio of said second distance to said fifth distance being between 0.050 and 0.085.

14. The integrated drive generator as set forth in claim 8, wherein there are one hundred and thirteen gear teeth at an outer periphery of said disc.

15. A method of replacing a variable block shaft in an integrated drive generator comprising the steps of:
   a) removing an existing variable block shaft from an integrated drive generator having an input shaft connected to a differential, said differential connected to a generator, and said differential also being connected to a hydraulic unit, said hydraulic unit including said existing variable block shaft connected to said differential, and a variable swash plate and a fixed swash plate, and each of said swash plates being associated with a set of pistons, and a fixed shaft associated with said fixed swash plate, and connected to rotate by a cylinder block associated with said fixed swash plate, and said fixed shaft including a spline connection to drive a fixed block shaft, said fixed block shaft having gear teeth engaged to a ring gear in said differential; and
   b) replacing said existing variable block shaft with a replacement variable block shaft having a shaft body extending from a first end to a second end, a radially enlarged disc formed at said first end and a shaft portion extending from said disc to said second end, an inner bearing race surface defined intermediate said first and second end and having an outer peripheral surface, and at axial length of said inner bearing race surface being defined between inner facing surfaces of lands extending radially outwardly of each axial side of said inner bearing race surface, and said axial distance being measured along the center axis of said body and an outer diameter to said inner bearing race surface being defined as a first distance, and said axial length of said inner bearing race surface being defined as a second distance, and a ratio of said first distance to said second distance being between 3.75 and 3.90.

16. The method of replacing a variable block shaft as set forth in claim 15, wherein a third distance is defined to an outer facing surfaces of said lands and a ratio of said second distance to said third distance being between 0.60 and 0.85.

17. The method of replacing a variable block shaft as set forth in claim 16, wherein an outer diameter to an outer surface of one of said lands is defined as a fourth distance and a ratio of said first distance to said fourth distance being between 0.70 and 1.00.

18. The method of replacing a variable block shaft as set forth in claim 17, wherein a fifth distance is defined between said first and second ends along said center axis and a ratio of said second distance to said fifth distance being between 0.050 and 0.085.

19. The method of replacing a variable block shaft as set forth in claim 15, wherein an outer diameter to an outer surface of one of said lands is defined as a fourth distance and a ratio of said first distance to said fourth distance being between 0.70 and 1.00.

20. The method of replacing a variable block shaft as set forth in claim 15, wherein a fifth distance is defined between said first and second ends along said center axis and a ratio of said second distance to said fifth distance being between 0.050 and 0.085.

* * * * *